Patented June 22, 1954

2,681,942

UNITED STATES PATENT OFFICE 2,681,942

FLUORINATED DIENE

Robert P. Ruh and Arthur F. Gordon, Midland, Mich., assignors to Dow Corning Corporation, Midland, Mich., a corporation of Michigan No Drawing. Application December 26, 1951, Serial No. 263,496

1 Claim. (Cl. 260—653)

This invention relates to a fluorinated linear diene.

It is an object of this invention to provide an economical compound which is useful as an additive for hydraulic fluids and for lubricants.

This invention relates to an unsaturated linear diene having the empirical formula $C_5Cl_5F_3$ and having a boiling point of about 175° C. to 176° C. at 754 mm.

The above compound may be prepared by reacting the chlorinated unsaturated pentene of the formula $CCl_2=CClCCl_2CHClCCl_3$ with antimony trifluoride at a temperature of from 100° C. to 250° C.

The compound of this invention is noninflammable, has a low freezing point and excellent compatibility with siloxane fluids and hydrocarbon oils. It is an excellent snuffing additive for hydraulic fluids, and a good high pressure additive for lubricants. In addition, the compound is a lubricant per se.

The following example is illustrative only and should not be construed as limiting the invention which is properly set forth in the appended claim.

Example

A mixture of 32 gram mols of

$CCl_2=CClCCl_2CHClCCl_3$ and 54 gram mols of $SbF_3$ were heated in a nickel-copper autoclave at 200° C. for 5 hours at a pressure of from 200 to 240 p. s. i. The product was washed with 17 per cent HCl until free of antimony salts, then with water until neutral and finally dried over anhydrous calcium sulfate. 8037 grams of product were obtained which upon distillation gave the compound $C_5Cl_5F_3$ boiling 175° C. to 176° C. at 754 mm. and having a density at 25° C. of 1.6620 and a refractive index at 25° C. of 1.4742. Upon analysis the compound was found to contain 59.4 per cent Cl, 19.2 per cent F, 20.5 per cent C, and nil hydrogen. Freezing curves indicated that the material was a mixture of isomers.

That which is claimed is:

A linear diene having the empirical formula $C_5Cl_5F_3$ and having a boiling range of about 175 to 176° C. at 754 mm.

No references cited